United States Patent
Duvall et al.

(10) Patent No.: US 6,847,825 B1
(45) Date of Patent: Jan. 25, 2005

(54) METHOD AND SYSTEM FOR PORTABLE CELLULAR PHONE VOICE COMMUNICATION AND POSITIONAL LOCATION DATA COMMUNICATION

(75) Inventors: William Duvall, Sudbury, MA (US); Rod DeMille, Sudbury, MA (US)

(73) Assignee: LoJack Corporation, Westwood, MA (US)

( * ) Notice: Subject to any disclaimer, the term of this patent is extended or adjusted under 35 U.S.C. 154(b) by 520 days.

(21) Appl. No.: 09/662,278

(22) Filed: Sep. 14, 2000

(51) Int. Cl.$^7$ ............................................. H04Q 7/20
(52) U.S. Cl. ........................... 455/456.3; 455/456.6; 701/213; 342/357.09
(58) Field of Search ........................ 455/456.1, 456.2, 455/456.3, 456.6, 456, 458, 557, 404, 556; 342/357.1, 357.09, 357.08, 357.01, 357.06, 357.12, 453; 701/213, 278, 117

(56) References Cited

U.S. PATENT DOCUMENTS

| | | | | |
|---|---|---|---|---|
| 5,365,450 A | * | 11/1994 | Schuchman et al. | 455/456.3 |
| 5,396,540 A | * | 3/1995 | Gooch | 455/456.3 |
| 5,515,419 A | * | 5/1996 | Sheffer | 455/456 |
| 5,544,225 A | * | 8/1996 | Kennedy et al. | 455/412.1 |
| 5,712,899 A | * | 1/1998 | Pace, II | 455/456 |
| 5,724,243 A | * | 3/1998 | Westerlage et al. | 455/456.5 |
| 5,918,180 A | * | 6/1999 | Dimino | 455/456.3 |
| 5,959,577 A | * | 9/1999 | Fan et al. | 342/357.13 |
| 5,986,543 A | * | 11/1999 | Johnson | 340/426 |
| 6,091,956 A | * | 7/2000 | Hollenberg | 455/456 |
| 6,131,067 A | * | 10/2000 | Girerd et al. | 701/213 |
| 6,199,045 B1 | * | 3/2001 | Giniger et al. | 705/1 |
| 6,320,535 B1 | * | 11/2001 | Hillman et al. | 342/357.1 |
| 6,339,745 B1 | * | 1/2002 | Novik | 701/208 |
| 6,347,281 B1 | * | 2/2002 | Litzsinger et al. | 701/213 |
| 6,677,894 B2 | * | 1/2004 | Sheynblat et al. | 342/357.1 |

* cited by examiner

Primary Examiner—Charles N. Appiah
(74) Attorney, Agent, or Firm—Rines and Rines

(57) ABSTRACT

A novel method of and system for enabling the use of one portable cellular phone only in voice communication over a radio voice channel with a cellular network control center for voice-requesting position or location data or other services; and, with the aid of a vehicle GPS-transpoder activated in response to signaling from the control center over a separate radio-data channel path, to receive and process at the vehicle GPS location,data from satellites, and to transmit the location data over the said data control path to the control center; and for then sending such data and information therefrom to the user of the portable cellular phone—the system being also adaptable for use by dispatcher managers of fleets of vehicles.

12 Claims, 1 Drawing Sheet

Figure 1:
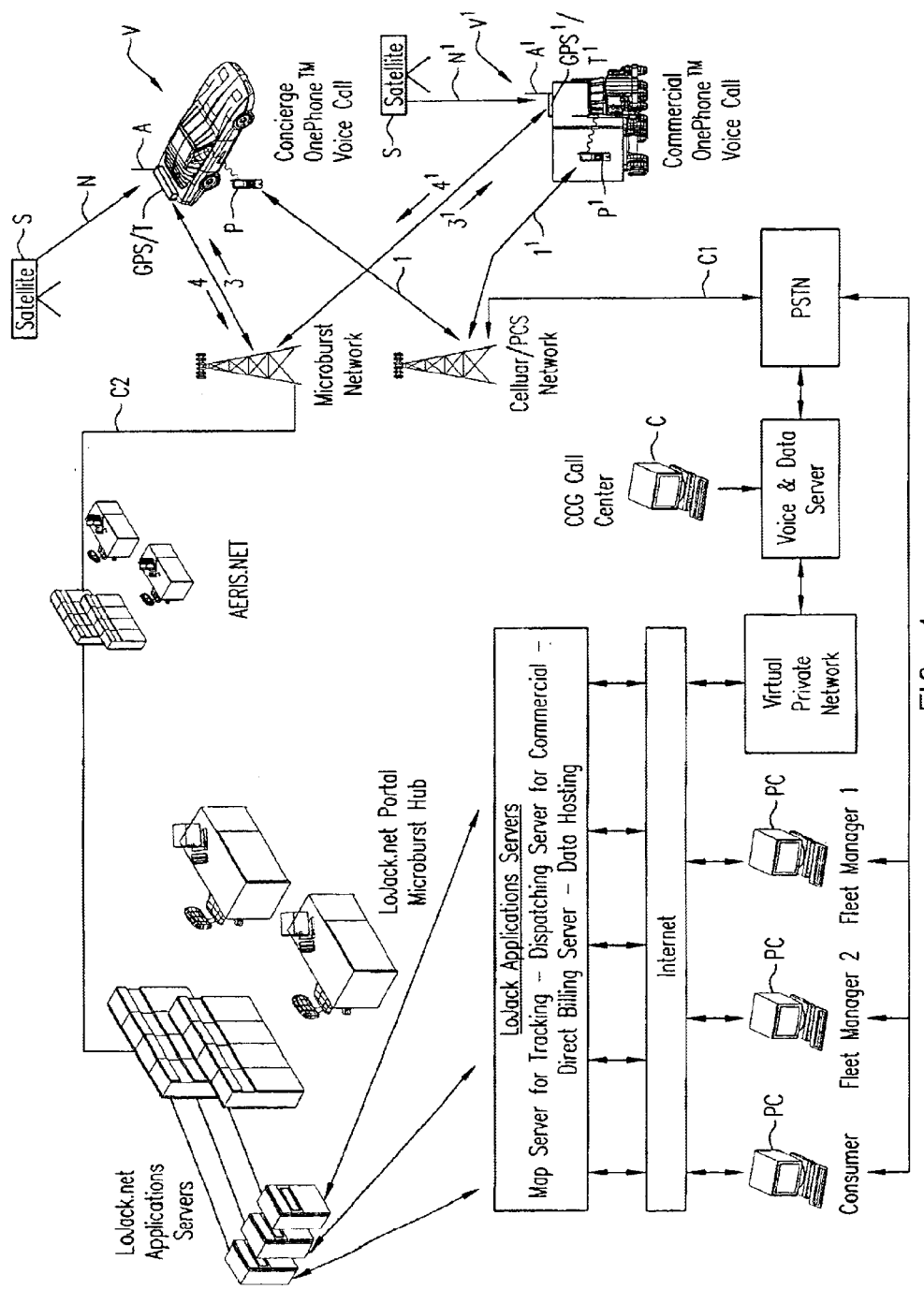

METHOD AND SYSTEM FOR PORTABLE CELLULAR PHONE VOICE COMMUNICATION AND POSITIONAL LOCATION DATA COMMUNICATION

The present invention relates to cellular telephone voice communication and positional location data communication; being more particularly, though not exclusively, concerned with vehicle communication equipment using cellular phones and provided with a GPS input, wherein the driver can call a central service center to receive directions or safety or security services, navigational aid and other services, through the mechanism of the central service center associating and coordinating the driver's call received along a radio voice-communications channel from the driver's cellular phone, with positional data from the driver's vehicle received along a separate data radio channel.

BACKGROUND

In the recent past, vehicular equipment has been provided to enable the reception by the driver of positional location services through a combined voice and data cellular phone equipped with a GPS receiver input, enabling the driver to call a central service center over a personal cellular phone to provide directions, safety services or security services to the driver of the vehicle. Among such products are "Onstar" by General Motors, the Ford "Rescu", and "Mercedes Benz Carin", among others. The current industry requires the owner of the car to pay a hardware fee for a vehicular telephone and GPS equipment, an activation fee for this second phone, a recurring monthly fee (which varies from $20–$25.00), and, additionally, a fee for usage, such as paying for the call by mitigated against the anticipated, but not as yet currently attained, commercial success hoped for in these products. The after-market also has been offering a combined voice and data cellular phone with a GPS module to accomplish these services in the same manner.

In accordance with a novel concept presented in my copending application Ser. No. 09/235,606, filed Jan. 20, 1999 for Improved Method Of And System For Portable Cellular Phone Voice Communication And Positional Location Data Communication Using The Cellular Phone Network Control, on the other hand, through a novel separation of voice and data aspects of the equipment, radio channels and services, the inhibiting charges and costs underlying present-day offerings are eliminated, and an expanded concept promising much wider acceptance of this technology, now appears in the offing.

That concept takes advantage, in its preferred low cost form, of the use of just one phone using the drivers existing cellular phone for the voice communication path, and the control channel of the cellular phone network for the data transmission path.

Specifically, a user calls the control center over the voice channel or link of the cellular telephone network to request information, such as, for example, location or directions. Upon receipt of the voice request along the radio voice channel, and upon PIN or other verification, the control center, using a separate radio data channel (preferably the facilities of the cellular network control channel in said copending application), sends a radio trigger signal along such separate data channel to a GPS receiver and transponder (transceiver) module in the consumer's vehicle to activate the GPS receiver to receive positional navigation location signals from the GPS satellite constellation. Such are processed in the module microprocessor of the transceiver module and activates the module transponder transmitter to send the resulting vehicle location data information back to the network operations control center via the data channel. Upon receipt of such vehicle location data, the network operations control center associates, coordinates or "marries" such with the appropriate consumer or user voice call request received along the cellular phone voice channel, and then communicates the requested positional or other service information data back to the consumer in the vehicle via the voice cellular phone channel. Thus, through the use of two different communication channels to provide voice on one and service data only on the other, there is only one telephone required by the consumer or user and only one telephone bill involved in the delivery of the services through marrying the voice and data at the control center.

Underlying the present invention is the realization, however, that, though perhaps not so cost-effective, other communications links or paths than the cellular telephone network control channel can be used for each or both of the data and voice components of this "one-phone" type of operation with the control center.

OBJECTS OF INVENTION

An object of the present invention, accordingly, is to provide a new and improved and expanded method of and system for portable cellular phone voice communication and positional location data communications, that shall not only obviate the prior art disadvantages above discussed, but that, in addition, through the use of the separation of voice and data aspects of the equipment, channels and services of said copending application, not only promises improved performance with substantially lower costs but adds the further possibility of using a variety of other communications links than the cellular telephone network control channel for either or both of separate voice and data communication.

Other and further objects will be explained hereinafter and are more particularly delineated in the appended claims.

SUMMARY

In summary, from one of its broader aspects, the invention embraces a method of voice and positional location data radio communication over a cellular phone network having a cellular radio voice channel path communicating with a network operations control center and a data radio channel path separately communicating with said network operations control center, the method comprising, user voice-calling the control center from a portable cellular telephone location over the cellular voice path, requesting location information services; upon user verification, sending a radio signal from the control center over the data channel path to be received at said location; providing a radio transponder and GPS receiver and microprocessor module at said location; activating the GPS receiver in response to receipt of said signal, to receive and process location data from the GPS satellite constellation and to activate the transponder to transmit processed location data over the data channel path to said control center; associating the transmitted location data with the user voice call request at the control center; and sending location service information from the control center to the user.

With the broadening features of the present invention beyond use of the cellular network control channel paths, the "one-phone" technique may be used with other data communications paths or links such as, for example, the Orbcom satellite communications link, using satellite transceiver in the vehicle transmitting to and from the satellite constellation.

It is also now possible to deliver the data information services via the Internet through a Web portal, such as, for example, the LoJack WebSite of the assignee of the present application; and there are multitudes of other usable data channels, as well, such as the Motorola 25 reflex paging, which uses a two-way paging network, and so forth.

Turning to the voice component as used in the "one-phone" system, it is similarly possible to use other communications links to establish voice contact from the driver of the vehicle to the control center, and the possibilities include so-called SMR (specialty mobile radio), VHF radio, UHF radio, and, additionally, other cellular technologies used in North America, and the so-called GSM technologies being used in Europe, and, in fact, any of the other cellular telephone protocols that are being used around world. It is also possible to use a satellite link as before-described, but for the voice channel as well as the data channel, such as the Paridum telephone network and others. The present invention thus expands the communications channels usable for both voice and data with the "one-phone" system concept.

Preferred and best mode designs and operation are later described.

DRAWINGS

The invention will now be explained in connection with the accompanying drawings, the single FIGURE of which is a schematic diagram illustrative of the techniques and systems of the invention, shown adapted for both consumer and commercial vehicular use, and in preferred form, though separate and independent consumer and commercial uses may be employed as later explained.

PREFERRED EMBODIMENT(S) OF INVENTION

As earlier mentioned, a major difference between what is currently used in the industry and the concept underlying the present invention involves the separation of the data and the voice aspects of the service. The user still makes voice calls over a radio voice path to the call center, with the user's own existing portable cellular phone. A separate vehicle module is provided which uses a vehicle—provided data transmitter-receiver portion of the vehicle module (not a full voice and data phone as presently required); transmitting the GPS and other data back along a separate data channel path. This is as contrasted with the present whole vehicle cellular telephone voice and data phone (and its further costs before discussed), built in as a requirement for the proper operation of the system. The invention, rather, relies on the user's portable phone for voice, and not any other dedicated in-car vehicle phone, which is confined or restricted to data transmission only. This means, as earlier mentioned, that there is no longer the need for the customer to have a second phone bill, additional to the user's portable phone, in light of the use of the minimal fee cellular network control channel path for positional data only.

In cellular phone network coverage areas, each AMPS (advance mobile phone standard) cell site generically has control channels that serve to alert the network of a user's presence so that the user may be located. The control channels set up calls, break down calls and switch cell sites. Although these control channels are necessary to enable voice operation, they remain otherwise unused for most of the time. While it has before been proposed in Aeries "MicroBurst" technology and in Bell South's "Cellemetry" to provide low data rate communication over such cellular control channels, the invention of my copending application uses the same for a very different purpose and in a very different system operation. Where the system of my copending application is used, therefore, only one recurring monthly fee must be paid for the user's existing portable phone, and there may be no further recurring fees for the vehicle module which communicates only over the control channel of the cellular network and only to transmit data.

As before explained, however, the present invention, while not so cost saving, expands the flexibility of the "one-phone" concept to enable use with a myriad of other radio communication links, both for voice and data, than just the cellular network control channel links, and provides for other features, including commercial fleet tracking and vehicle dispatcher use, as well.

Turning now, to the embodiment shown in drawing, the customer user in the vehicle V (labeled "Concierge One Phone™ Voice Call") is shown calling at 1 on any type of existing cellular phone P, presumably one that the driver already owns, to the network operations call center, so labeled at C.

While in FIG. 1, a web portal labeled "LoJack.net Portal" is shown to the left, it may be ignored for this initial explanation of consumer vehicle operation, such that the center C will receive the cellular phone call from the phone P through the appropriate network antenna "CELLULAR NETWORK" over the normal voice cellular radio phone channel C1; and, in usual fashion, verifies that the caller's user ID is correct, as by requesting a PIN code at 2, as is well known. Then the call center C separately and independently, using the PIN code, looks up the appropriate data channel access number, and sends' or "pings" a radio query at 3, along path C2 and the data channel transmitter antenna ("MICROBURST NETWORK"), to a transponder-GPS receiver module, GPS/T, provided in the vehicle V. The receipt of the radio signal "ping" 3 by the vehicle module antenna A, wakes up or activates the GPS receiver ("GPS") therein and calculates by its microprocessor, the vehicle position as determined by receiving the navigation signals N from the GPS satellite constellation S. The vehicle module transponder transmitter portion "T" is then activated to respond back at 4 along the data channel path $C_2$, with the vehicle position location data information and any other data information which may be selected for sending along the control path C 2, back to the network operations call center C. The center C, having associated or "married" the voice and corresponding data channels, can now inform the caller where the vehicle is currently located, thereby enabling driver planning and executing of vehicle routes, and/or providing other services. By associating this information received along the data channel with the appropriate user voice call request received along the cellular phone channel C1, the control center C then communicates the requested positional or other service information back to the user phone 1 in the vehicle V by the voice channel path C1-1.

As earlier described, in accordance with the invention, there are many options available to select desired separate voice and data communication links or paths.

Further facilities are shown provided by the previously ignored "LoJack.net Portal" and "Internet Connection and Servers" shown to the left in the drawing. The "MICROBURST" antenna is shown connected in the previously described Aeries type of network, interfacing with the illustrative "LoJack.net Portal" and "Servers", accessed via the Internet by consumer or dispatch or fleet manager PC stations, so-labeled.

In the consumer version of the "one-phone" system, moreover, the consumer can also access a number of services by calling the LoJack Service Center using the existing telephone P. In order to use the service, the customer calls a toll-free number, which is answered by person, and tells the person what the (or she) wants. The consumer can choose from a number of options such as:

Current Location

Roadside Service

Medical Assistance

Turn by turn directions

Unlock vehicle doors

Concierge services (nearest Hilton hotel, Bickford's restaurant, Flight Arrival, etc.)

In addition, the consumer may also log onto LoJack.net and determine the present location of his vehicle from a remote home office, if desired. The consumer "One-Phone" product, therefore, offers safety, security and convenience to the private vehicle owner, without the necessity for a second voice channel telephone resident in the vehicle. The advantages are lower hardware cost, and lower recurring costs, than the services currently offered, as earlier explained.

As earlier stated and as is also shown in the drawing, the invention also has important applications for vehicle fleet dispatchers and managers.

A commercial version of the system, so labeled at the right-center of the drawing, consist of a "One-Phone" software package installed in a desktop PC, lower left of drawing which resides in the office of the dispatcher of the company subscribing to the "One Phone"™ commercial service. The same "One Phone" unit P and a GPS/transceiver $GPS^1/T^1$ and antenna $A^1$ is installed in the commercial vehicle $V^1$.

To use the service, the dispatcher logs onto LoJack.net Portal, and enters the user name and password. A second screen will then display a number of options to choose from, such as, Last five locations and time.

Determine current location.

Exception reports

History reports (last hour, day, week, month)

Average speed over x time

Etc.

The dispatcher will "click" on one of the options; and, after receiving the information, will decide what action to take. This allows the dispatcher to know the location of all of the mobile units in the fleet at any given time, without having to interrupt the driver or tradesman. If there.is an issue, the dispatcher may then elect to call or radio the person in or near the vehicle.

The invention thus provides, also, a management tool, used not by the driver, but by managers to improve the efficiency of an operation.

Further modifications will also occur to those skilled in this art, and such are considered to fall within the spirit and scope of the invention as defined in the appended claims.

What is claimed is:

1. A method of voice and GPS satellite constellation positional location data radio communication over a cellular phone network having a user cellular radio voice channel path communicating at a cellular phone network frequency with a network operations control center, and a separate data radio channel path separately communicating along a different frequency with said network operations control center, the method comprising user voice-calling the control center from a portable cellular telephone location over the cellular radio frequency voice path, requesting user location and other information services; upon user verification, sending a radio wake-up signal from the control center over the data different frequency channel path to be received at said location; installing a radio transponder operable at said different frequency and a GPS receiver of GPS satellite constellation location data transmission frequency and a microprocessor module at said location; activating the GPS receiver, in response to receipt of said wake-up radio signal by the transponder, to receive and process the location data received at the GPS frequency from the GPS satellite constellation by the GPS receiver and thereupon to activate the transponder to transmit the processed location data over the data channel path to said control center; associating the transmitted location data received at the control center with the user voice call request at the control center; and sending location services information from the control center to the user over the cellular radio frequency voice channel path.

2. The method of claim 1 wherein said data channel path is selected from the group consisting of satellite communications links, two-way paging networks and through web portals via the internet.

3. The method of claim 1 wherein said voice channel path is selected from the group consisting of SMR, VHF, UHF, GSM, satellite and cellular telephone network control channel links.

4. The method of claim 1 wherein the user is a vehicle user and the radio transponder, GPS receiver and microprocessor module are installed in the vehicle, such that when the user is remote from the vehicle, the user accesses a web portal interfacing with said channels to determine the location of the vehicle.

5. The system of claim 4 wherein said data channel path is selected from the group consisting of satellite communications links, two-way paging networks and through web portals via the internet.

6. The system of claim 4 wherein the said voice channel path is selected from the group consisting of SMR, VHF, UHF, GSM, satellite and cellular telephone network central channel links.

7. The system of claim 4 wherein software is provided to enable vehicle fleet dispatchers or managers to access the GPS-transponder modules of the vehicles of the fleet, enabling the tracking of the location of such vehicles without interrupting the vehicle driver or user.

8. The system of claim 7 wherein means is provided for enabling the dispatchers or managers also to access a web portal interfacing with said channels for obtaining fleet information options through the internet.

9. The system of claim 4 wherein the user is a vehicle user and is provided with means, operable remotely from the vehicle, for accessing a web portal interfacing with said channels to determine the location of the vehicle.

10. A method of voice and GPS satellite constellation positional location data radio communication by dispatchers or managers of vehicle fleets, wherein voice communication is carried out over a user cellular radio voice channel path communicating at a cellular phone network frequency with a network operations control center, and location data communication is carried out over a separate data radio channel path separately communicating alone a different frequency with said network operations control center, the method comprising, user voice-calling the control center from a portable cellular telephone vehicle location over the cellular radio frequency voice path requesting vehicle location and other information services; upon user verification, sending a radio wake-up signal from the control center over the data different frequency channel path to be received at said vehicle location; installing a radio transponder operable at said different frequency and a GPS receiver of GPS satellite constellation location data frequency and a microprocessor module at the vehicle location; activating the GPS receiver, in response to receipt of said radio wake-up signal at said vehicle location, to receive and process the vehicle location data received at the GPS frequency from the GPS constellation for the vehicle by the GPS receiver and to activate the transponder to transmit the processed vehicle location data over said different frequency data channel path to said control center; associating the transmitted location data received at the control center with the user voice call request at the control center; and sending vehicle location services information from the control center to the user over the cellular radio frequency voice channel path; and wherein vehicle fleet dispatchers or managers access the GPS-transponder modules of the vehicles of the fleet, tracking the location of such vehicles of the fleet without interrupting the vehicle user.

11. The method of claim 10 wherein the dispatchers or managers also access a web portal for obtaining information options through the internet.

12. A system for voice and GPS satellite constellation positional location data radio communication over a cellular phone network having a user cellular radio voice channel path communicating at a cellular phone network frequency with a network operations control center, the system having also a separate data radio channel path separately communicating along a different frequency with said network operations control center, said system having, in combination, a portable cellular telephone for user voice-calling to the control center over the cellular radio frequency voice path, for requesting user location information services; means operable upon user identification, for sending a radio wake-up signal from the control center over the data different frequency channel path to be received at the user location; a radio-transponder, GPS receiver and microprocessor module installed at said location, with the transponder operable at said different frequency and the GPS receiver operable at the GPS satellite constellation location data transmission frequency; means for activating the GPS receiver of the module in response to receipt of said radio wake-up signal at said location, to receive and process the location data received at said GPS frequency from the GPS satellite constellation for the vehicle by the GPS receiver and thereupon to activate the transponder to transmit the processed location data over said different frequency data channel path to said control center; and means for sending location services information from the control center over the cellular radio frequency voice channel path to the user upon associating the transmitted location data with the user voice call request.

* * * * *